United States Patent

Hunter

[15] 3,699,533

[45] Oct. 17, 1972

[54] MEMORY SYSTEM INCLUDING BUFFER MEMORIES

[72] Inventor: Gregory Michael Hunter, Princeton, N.J.

[73] Assignee: RCA Corporation

[22] Filed: Oct. 29, 1970

[21] Appl. No.: 85,190

[52] U.S. Cl. ....................340/172.5

[51] Int. Cl. ....................G06f 7/00

[58] Field of Search ....................340/172.5

[56] References Cited

UNITED STATES PATENTS

| | | | |
|---|---|---|---|
| 3,585,605 | 6/1971 | Gardner | 340/172.5 |
| 3,462,744 | 8/1969 | Tomasulo et al. | 340/172.5 |
| 3,387,283 | 6/1968 | Snedaker | 340/172.5 |
| 3,339,183 | 8/1967 | Bock | 340/172.5 |

*Primary Examiner*—Harvey E. Springborn
*Attorney*—H. Christoffersen

[57] ABSTRACT

A memory system is disclosed which includes a large main memory having information block storage locations addressable by an address consisting of set and tag bits, two buffer memory banks each having storage locations addressable by the set bits for the storage of tags and associated information blocks, and a small content-addressed memory for the storage of associated tags, sets, and information blocks. Initially, all information blocks are in the main memory, and accessing an information block results in a transfer of the block with its tag to one or the other of the buffer memories at a location determined by the set bits. Later, when another information block belonging to the same set is accessed, it is stored in the other buffer memory bank. Subsequently, when a third information block of the same set is accessed, one of the information blocks is displaced from the buffer memory bank to the content-addressed memory where it is stored with its tag and set bits. The system operates so that there is a high probability that a desired information block will be present and rapidly accessible in one of the buffer memory banks or the content-addressed memory.

8 Claims, 2 Drawing Figures

INVENTOR
Gregory M. Hunter

BY Carl V. Olson
ATTORNEY

INVENTOR
Gregory M. Hunter

BY Carl V. Olson
ATTORNEY

MEMORY SYSTEM INCLUDING BUFFER MEMORIES

BACKGROUND OF THE INVENTION

In a computer system, the computer processor operates at a high speed which can not be matched by a memory of desired large size. Therefore, the processor is normally used with a memory hierarchy including a small, fast memory; a large, relatively slow memory; and means to transfer information between the large memory and the fast memory. Many information transfer schemes have been considered to improved the probability that information will be present when desired in the small, fast memory.

In one arrangement, the processor can directly address both a large, slow memory and two small, fast, buffer memory banks. The addresses in the large memory are divided into sets, and each buffer memory bank has a number of storage locations equal to the number of sets. The two buffer memory banks can thus contain two different information blocks belonging to the same set. This arrangement is superior to one having a single buffer memory bank of comparable size because, due to the statistical nature of memory accesses in the execution of a program, there is a higher probability that a desired information block will be present in one of the two buffer memory banks. An example of a computer having two buffer memory banks is the IBM System/370 Model 155 computer. The buffer storage system is described in pages 193–197 of the book entitled "Computer Organization and the System/370" by H. Katzan, Jr., and published by Van Nostrand Reinhold Company.

Prior art arrangements are described in a copending application, now U.S. Pat. No. 3,601,812, issued on Aug. 24, 1971, to Joseph A. Weisbecker, entitled "-Memory System" and assigned to the assignee of this present application. In the patent, FIGS. 2 and 3 illustrate a system including a large or main memory 52 and a small single-bank buffer memory 20. FIGS. 5 and 6 of the Patent illustrate a system including a main memory 52 and a buffer memory 20 including two banks X and Y.

SUMMARY OF THE INVENTION

According to an embodiment of the invention, a memory system includes a main memory, one or more buffer memory banks, and a small content-addressed memory which receives information displaced from the buffer memory banks. The system operates to greatly increase the probability that a desired information word will be rapidly accessible from one of the buffer memory banks or the content-addressed memory.

DESCRIPTION OF THE PREFERRED EMBODIMENT

Figure 1:
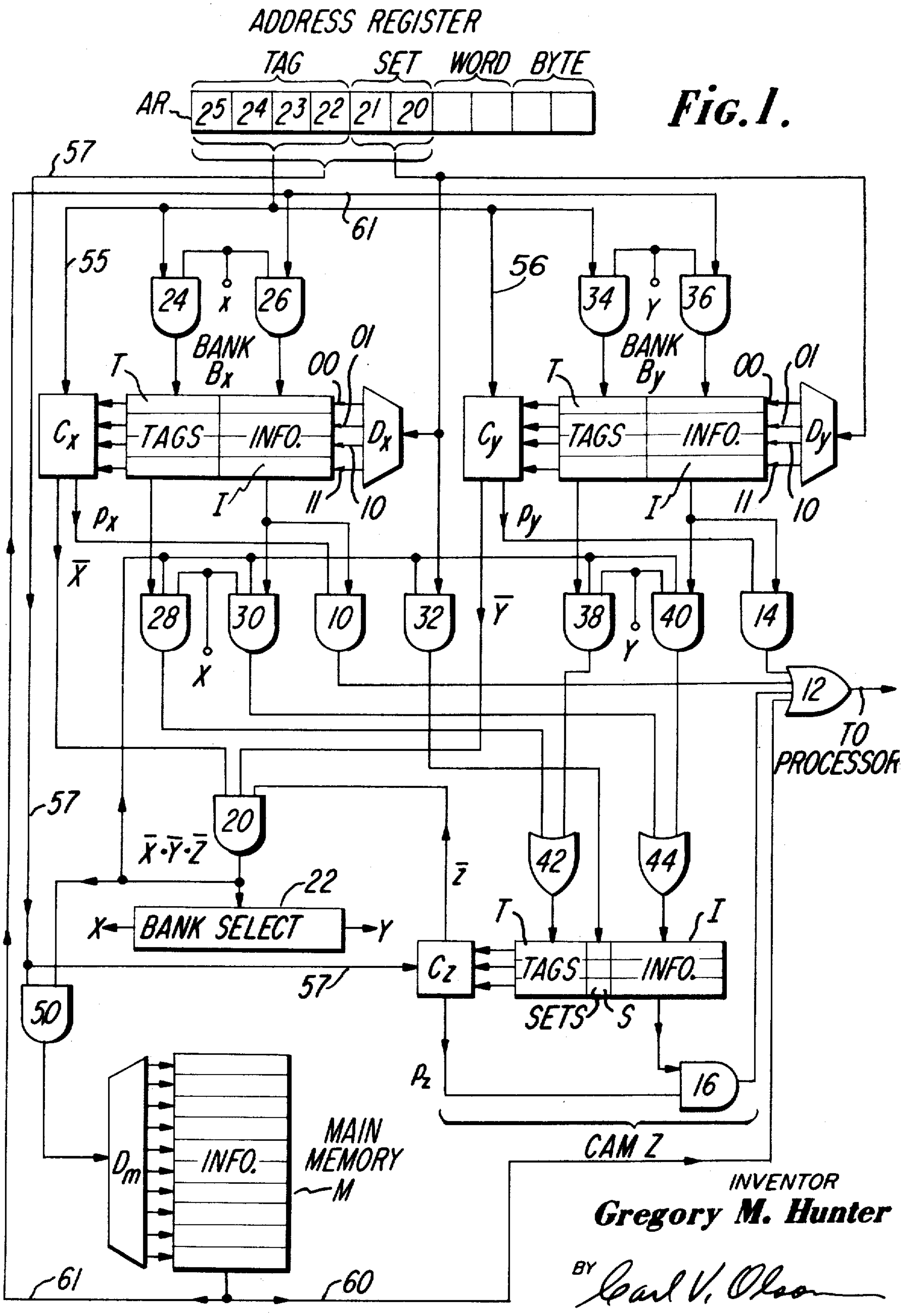
FIG. 1 is a diagram of a computer memory system constructed according to the teachings of the invention.

Referring to FIG. 1, an address register AR provides storage locations for address bits which include low order $2^0$ and $2^1$ "set" bits SET, and high order $2^2$ through $2^5$ "tag" bits TAG. The contents of the portions SET and TAG of the address register are employed to address any desired storage location in a main memory M. Each memory location in main memory M contains a block of information. Each block of information includes a plurality of information words, and each word contains a plurality of information bytes. The system to be described employs the contents of the set and tag portions of address register AR. In an actual computer system, additional means (not shown), are provided to utilize the contents of the word and byte portions of the address register for separating words and bytes from the information block addressed by the contents of the set and tag portions of the address register.

The main memory M includes an address decoder $D_m$ for receiving the contents of the set and tag portions of the address register and for accessing or reading out the contents of one of the information block storage locations in the main memory.

In the simplified illustrative example of the invention, the main memory M is assumed to have storage locations for 64 information blocks. In actual practice, memory M may, for example, have storage locations for 32,000 information blocks.

The system also includes two buffer memory banks $B_x$ and $B_y$ each having storage locations I for four information blocks. In an actual computer system, each bank may, for example, have storage locations for 128 information blocks. Each storage location in a buffer memory bank includes also storage locations T for the tag bits associated with the respective information block. A decoder $D_x$ is receptive to the contents of the set portion of the address register AR and is operative to select a corresponding one of the four storage locations in bank $B_x$. One of the four locations in bank $B_y$ is simultaneously selected through an identical address decoder $D_y$.

The buffer memory banks $B_x$ and $B_y$ are provided with respective comparators $C_x$ and $C_y$. The comparators are receptive to the contents of the tag portion of the address register, and are receptive to the of any one of the blocks stored in the respective memory bank which is accessed by the set bits applied to the decoders $D_x$ and $D_y$. Each comparator produces a "present" output signal $p_x$ or $p_y$ when the tags from the address register AR match a tag accessed from the respective memory bank. The "present" signal $p_x$ enables gate 10 to transfer the contents of the addressed information block location in bank $B_x$ through OR gate 12 to the computer processor (not shown). Similarly, the "-present" signal $p_y$ enables gate 14 to pass the contents of the addressed information block location from bank $B_y$ through OR gate 12 to the processor. When there is not match, the comparators $C_x$ and $C_y$ produce "not present" output signals $\bar{x}$ and $\bar{y}$. It will be understood that all of the gates referred to herein, except gate 20, are multi-unit gates for passing an appropriate number of binary bit signals.

What has thus far been described is shown in FIG. 5 of the aforementioned U.S. Pat. No. 3,601,812, where main memory 52 corresponds with main memory M, the upper half of buffer memory 20 corresponds with buffer memory bank $B_x$, the lower half of buffer memory 20 corresponds with buffer bank $B_y$, the low order address bits applied to the decoder correspond with bits labeled SET, and the high order address bits correspond with bits labeled TAG.

The memory system also includes a content-addressed memory Z illustrated as including three storage locations I for three information blocks together with locations S and T for the set and tag bits constituting the addresses of the corresponding information blocks. In an actual computer system, the content-addressed memory may, for example, include storage locations for 16 information words. The content-addressed memory Z is illustrated as including a comparator $C_z$ which is receptive to the contents of the set and tag portions of the address register AR and is also receptive to all of the sets and tags stored in the memory Z. The comparator $C_z$ produces a "present" signal $p_z$ when the set and tag bits from the address register match the set and tag bits in any one of the storage locations in the memory Z, and produces a "not present" signal $\bar{z}$ when there is no match. When a "present" signal $p_z$ is generated, the signal causes the transfer of the identified information block from the memory Z through an AND gate 16 and OR gate 12 to the processor (not shown). The comparator $C_z$ may be as described in the article "A Magnetic Associative Memory" by J. V. Kiseda et al. pages 106–121 of the April, 1961, IBM Journal of Research and Development, or in U.S. Pat. No. 2,973,508 on a "Comparator" issued to F. Chadurjian on Feb. 28, 1961.

The elements in FIG. 1 which have thus far been described include elements provided for the purpose of determining whether an information block having an address specified by the contents of the address register AR is present in the buffer memory bank $B_x$, the memory bank $B_y$ or the content-addressed memory Z. Means have also been described for transferring a located information block to the computer processor. The means necessary for transferring information blocks from the main memory M to the buffer memories $B_x$, $B_y$ and Z will now described.

An AND gate 20 receives "not present" signals $\bar{x}$, $\bar{y}$ and $\bar{z}$ from comparators $C_x$, $C_y$ and $C_z$, respectively. The gate 20 therefore provides an output $\bar{x}\cdot\bar{y}\cdot\bar{z}$ when the set and tag bits in the address register AR identify an information block which is not present in any of the buffer memories $B_x$, $B_y$ and Z. This signal is supplied to bank select logic 22, which provides one or the other of two output signals $x$ and $y$ for the utilization of buffer bank $B_x$ or buffer bank $B_y$, respectively. (Signals $x$ and $y$ are not logic complements of signals $\bar{x}$ and $\bar{y}$).

The signal x is employed to enable gates 24 and 26 for the transfer of a tag from address register AR, and an information block from main memory M, to the buffer memory bank $B_x$. The signal $x$ is also employed to enable gates 28 and 30 to transfer a tag and corresponding information block from the bank $B_x$ to the content-addressed memory Z. In this transfer, it is necessary that gates 28 and 30 be also enabled by the signal $\bar{x}\cdot\bar{y}\cdot\bar{z}$ from gate 20. The signal $\bar{x}\cdot\bar{y}\cdot\bar{z}$ also enables a gate 32 for the transfer of set bits from register AR to the content-addressed memory Z. With respect to buffer memory bank $B_y$, gates 34 and 36 are enabled by signal $y$ to pass a tag from register AR and a corresponding information block from main memory M, to the bank $B_y$. Gates 38 and 40 are enabled by signal $y$ and signal $\bar{x}\cdot\bar{y}\cdot\bar{z}$ and pass a tag and corresponding information block from bank $B_y$ to the memory Z. The transfers of tags to memory Z go through an OR gate 42, and the transfers of information blocks to memory Z go through an OR gate 44.

A gate 50 is enabled by the signal $\bar{x}\cdot\bar{y}\cdot\bar{z}$ to pass the address in register AR to the address decoder $D_m$ of main memory M.

The buffer memory banks $B_x$ and $B_y$ are constructed in a known manner such that when a tag and information block are entered into a location that was already occupied, the displaced tag and information block are read out and transferred to the content-addressed memory Z. The one of two locations from which a tag and information block is displaced is the one which was filled earliest, so as to provide a first-in, first-out mode of operation. The one of the two locations is determined by the bank select logic 22 which corresponds with the "word select logic" 62 in FIG. 5 of U.S. Pat. No. 3,601,812. Alternatively, the one of two locations from which a tag and information block is displaced may be the one which was least recently accessed by the processor, or was least frequently accessed during an immediately-preceding time period. The different schemes are called "replacement" algorithms, and are described on page 13 of an article entitled "Concepts for Buffer storage" by C. J. Conti of IBM appearing the Computer Group News, March, 1969. More detailed information is given in U.S. Pat. No. 3,541,529 issued on Nov. 17, 1970, to R. A. Nelson on a "Replacement system."

The content-addressed memory Z is constructed in a known manner such that when the memory Z is already full, a set, tag and information block applied to the memory Z are stored in a previously-occupied location, and the displaced information block is returned to the main memory M at a location determined by the set and tag bits. The one of three locations from which a set, tag and information block is displaced is the one which was least recently accessed by the processor. Alternatively, the location from which a set, tag and information block is displaced may be the one filled earliest to provide first-in, first-out operation, or may be the one which was least frequently accessed during an immediately-preceding time period.

The bank select logic 22 is provided to control which one of banks $B_x$ and $B_y$ will be utilized at any given time for the storage of an information block. The bank select logic 22 may be simply constructed to alternate the employment of banks $B_x$ and $B_y$. However, improved system results are obtained when the bank select logic 22 operates in a more sophisticated manner and keeps account of its previous decisions. That is, the bank select logic 22 should preferably utilize bank $B_y$ if the last preceding utilization of the same storage location was in bank $B_x$, and vice versa. In this way, it is assured that successively accessed information blocks belonging to the same set (as determined by the set bits in register AR) will both be stored in respective ones of the banks $B_x$ and $B_y$. This type of bank select logic 22 is known as the first-in, first-out type because it results, when a third information block belonging to the same set is applied to the one of the banks, in the displacement of the first information block applied to the banks. Other known constructions of the bank select logic 22 may be employed.

Although the buffer memory banks $B_x$ and $B_y$ are shown with separate decoders $D_x$ and $D_y$, a single decoder can be used for both banks, as shown in FIG. 5 of U.S. Pat. No. 3,601,812. The tags need not be stored in the same physical memories as the information blocks, as shown, but may be stored in a separate memory having its own decoder, as shown in FIG. 7 of U.S. Pat. No. 3,601,812.

The described memory system includes means which respond to an address supplied to the address register AR to transfer an information word through OR gate 12 to a computer processor. It will be understood that an actual memory system will also include corresponding means to transfer an information word from the computer processor to the memory system.

OPERATION

The operation of the system of FIG. 1 will now be described starting with the condition in which main memory M contains information blocks in its 64 storage locations, and buffer memories $B_x$, $B_y$ and Z are empty of stored information. When an initial address is supplied by the computer processor to the address register AR, the tag bits in the portion TAG of the register are applied over lines 55 and 56 to comparators $C_x$ and $C_y$ of buffer memory banks $B_x$ and $B_y$. Since the banks are empty of tags, the comparators produce "not present" outputs $\bar{x}$ and $\bar{y}$. At the same time, both the set and tag bits in the register AR are applied over lines 57 to the comparator $C_z$ of the content addressed memory Z. Since the memory Z is empty of tags, the comparator produces a "not present" signal $\bar{z}$.

The three "not present" signals are applied to AND gate 20 to produce the output $\bar{x}\cdot\bar{y}\cdot\bar{z}$ which enables gate 50 to pass the set and tag bits on lines 57 to the address decoder $D_m$ of the main memory M. The thus-addressed information block in main memory M is then applied over lines 60 and through OR gate 12 to the processor. At the same time, the information block is applied over lines 61 to gates 26 and 36 of memory blocks $B_x$ and $B_y$. It is assumed that the bank select logic 22 has responded to the "not present" signals to produce a signal $x$ which enables gate 26 to pass the information block from memory M, and enables gate 24 to pass the tag from register AR. The set bits from register AR are decoded by decoder $D_x$ to access one of the four storage locations in bank $B_x$ to receive the information block and the associated tag. It is assumed that the set bits specify the second storage location having the address 01.

The next address supplied to register AR may be the address of any one of the 64 locations in main memory M. It is probable that the next address will be for a location belonging to one of the other three sets 00, 10, or 11. If this is so, the described operation will be repeated and will result in the transfer of an information block from main memory M to the processor and a storage of the same information block together with its tag in the bank $B_x$ at a location determined by the set bits of the address.

It is now assumed that the third address supplied to register AR is similar to the first address in belonging to the same set and having set bits 01. This third address, however, is assumed to have a different distinctive combination of tab bits. The logic determines that the desired information block is not present in the buffer memories, and the desired block is therefore transferred from the main memory M to the processor, and is supplied over bus 61 to the buffer banks. In this instance, the bank select logic 22 remembers that the first address belonged to the same set 01 and that the first information block and tag were stored in bank $B_x$. Therefore, the bank select logic 22 provides output y which enables gates 34 and 36 to store the present tag and associated information block at the second location 01 in buffer bank $B_y$. There now are two information blocks belonging to the same set stored in the second locations 01 of banks $B_x$ and $B_y$.

It is now assumed that a fourth different address supplied to register AR specifies a storage location in main memory M which belongs as the same set 01 as the information blocks stored in the second locations of banks $B_x$ and $B_y$. Since the desired information block is not in the buffer memories, the information block is transferred from the main memory to the processor, and is transferred to the bank $B_x$ under control of bank select logic 22. When the information block previously stored in location 01 of bank $B_x$ is thus displaced, the displaced information block is transferred through gates 30 and 44 to the first storage location in the content-addressed memory Z. At the same time, the tag corresponding to the displaced information block is transferred through gates 28 and 42 to the tag portion T of the same first location in memory Z. Simultaneously, the set bits of the address of the displaced information block (which are the same as the bits of the address of the present information block) are supplied through gate 32 to the set portion S of the same first storage location in memory Z. There now are three different information blocks all belonging to the same set 01 stored in the three buffer memories $B_x$, $B_y$ and Z. It is therefore probable that an information block will be desired in the future which will be present in one of the three buffer memories and will be quickly available therefrom. (If the following two information blocks desired also belong to the set 01, the memory Z will be filled and there will then be a total of five blocks of the same set available for rapid access from the buffer memory system.)

The operation as described continues and results in the storage of recently accessed memory blocks in the three buffer memories. While this is going on, an address may be supplied to register AR which calls for an information block already present in one of the buffer memories. If the desired information block is present in one of the buffers $B_x$ or $B_y$, this fact is determined by the operation of one of the comparators $C_x$ or $C_y$ in comparing the tag bits of the address with the tag bits stored in the block location specified by the set bits of the address. The comparator then generates a signal $p_x$ or $p_y$ which enables gate 10 or 14 to transfer the information block specified by the set bits from one of the banks to the processor. The desired information block is thus very rapidly supplied to the processor without the greater delay required in transferring the block from the large, slow, main memory M.

If the desired block is present in the content-addressed memory Z, this fact is determined by the comparator $C_z$ which compares the set and tag bits from register AR with the set bits and tag bits stored in all of the locations in memory Z. The comparator $C_z$ provides a "present" output signal $p_z$ which enables gate 16 to pass the information block from the identified location in memory Z to the processor.

Figure 2:
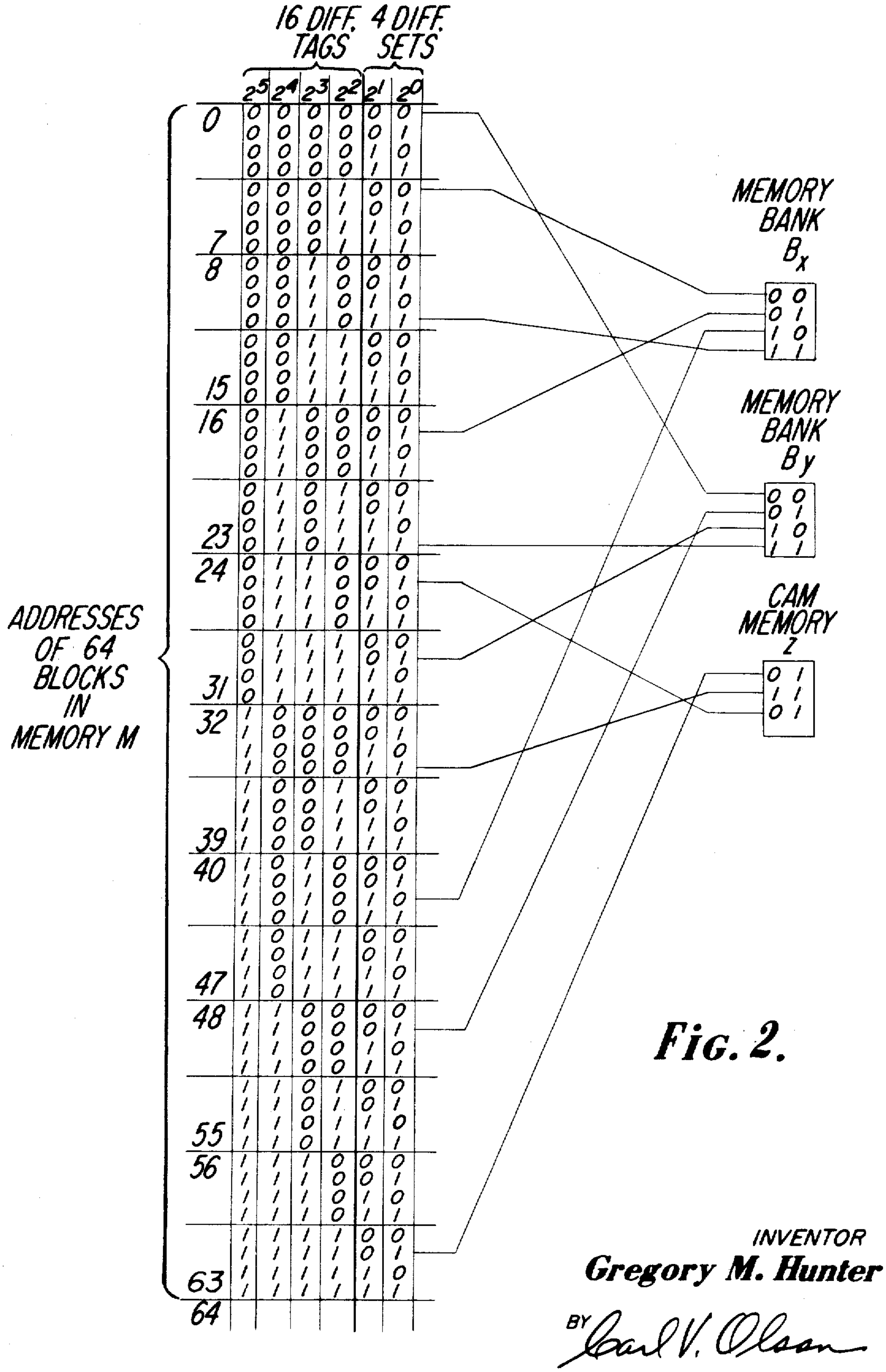
FIG. 2 is a chart of memory addresses which will be referred to in describing the operation of the system of FIG. 1.

The chart of FIG. 2 shows an example of possible contents of the buffer memories at a given instant in time. Banks $B_x$ and $B_y$ each contain four different information blocks belonging to the sets 00, 01, 10 and 11. The content-addressed memory Z contains two different information blocks belonging to the set 01, and one block belonging to the set 11. Lines in the drawing show where the eleven blocks are randomly located in the main memory M.

THEORY OF OPERATION

In the design of a memory buffering system, the object is to construct a configuration which is both economical in the amount of hardware required, and which in operation provides a high probability that any desired information block will be present in a small, fast buffer for rapid access.

In the execution of a computer program, sequentially-needed instruction words and data words are often stored in respective sequential locations in memory. As such, many sequentially-needed instruction words are often included in a given information block, and sequentially-needed data words are often included in another information block. Once the information blocks are present in a small fast buffer memory, the subsequently needed words are rapidly accessible to the computer processor. Therefore, a buffer system should contain recently-used information blocks.

At any given time, the information block needed in the execution of a program may be a block located anywhere in the main memory M. The three most recently used information blocks, for example, may be at any combination of three locations in the main memory. Therefore, the number of different combinations of the information blocks in main memory M which can be stored in a buffer system at the same time is a measure of the merit of the buffer system.

In a comparison made between a buffering system including solely two buffer banks $B_x$ and $B_y$ with a comparable system including four memory banks having the same total buffer storage capacity as the two memory banks $B_x$ and $B_y$, it was found that the two-bank system was capable of storing about 5 percent of the possible combinations of memory blocks stored in the main memory M, and the four-bank system was capable of storing about 30 percent of the possible combinations of memory blocks in the main memory. However, in a comparable system according to the invention including two memory banks $B_x$ and $B_y$, and, in addition, including a small content-addressed memory Z for the over-flow from the buffer banks, it was found that the system was capable of storing about 95 percent of the possible combinations of information blocks present in the main memory M. The compared systems each had the same total number of buffer storage locations.

The outstanding performance of the described system results from the fact that the content-addressed memory Z cooperates with the memory banks $B_x$ and $B_y$ to provide storage locations, when needed, for a relatively large number of recently utilized information blocks which belong to the same set, as determined by the address set bits. The illustrated system, for example, is capable of storing as many as five information blocks belonging to the same set. In this extreme case, one block of the same set is in each of the buffer memories $B_x$ and $B_y$, and three blocks are in the content-addressed memory Z. FIG. 2 illustrates a case where four different information words belonging to the set 01 are stored in buffers $B_x$, $B_y$ and Z. In general, the system including a small content-addressed memory is capable of storing almost all combinations of a given number of information blocks regardless of how the addresses of the information blocks are scattered around in the main memory M. At the same time, the system is much more economical in the amount of hardware required than other systems providing comparable performance.

What is claimed is:

1. A buffer memory system, comprising
   an address register for set bits and tag bits,
   a main memory having information block storage locations addressable by said set and tag bits in combination,
   a buffer memory having storage locations addressable by said set bits for the storage of tags and associated information blocks,
   means utilizing the contents of said address register to transfer an addressed information block from said main memory and a corresponding tag from said address register to a location in said buffer memory determined by the set bits in said address register,
   a content-addressed memory for the storage of associated tags, sets and information blocks, and
   means to transfer an information block and associated tag bits from said buffer memory together with set bits from said address register to said content-addressed memory.

2. A buffer memory system, comprising
   an address register for set bits and tag bits,
   a main memory having information block storage locations addressable by said set and tag bits in combination,
   two buffer memory banks each having storage locations addressable by said set bits for the storage of tags and associated information blocks,
   means utilizing the contents of said address register to transfer an addressed information block from said main memory and a corresponding tag from said address register to a buffer memory bank at a location determined by the set bits in said address register,
   a content-addressed memory for the storage of associated tags, sets and information blocks, and
   means to transfer an information block and associated tag bits from a buffer memory bank together with set bits from said address register to said content-addressed memory.

3. A system as defined in claim 2, wherein each of said two memory banks has storage locations for one information block belonging to each of the sets of information blocks.

4. A system as defined in claim 3, and in addition, a bank selection logic unit for selectively directing an information block to one of the two banks.

5. A system as defined in claim 4 wherein each said memory bank is constructed so that a tag and information block displaced from a storage location therein is transferred to said content-addressed memory.

6. A system as defined in claim 5, and in addition, means to determine whether a desired information block is present in any of said memory banks and said content-addressed memory, and means conditioned thereby to read out the desired information block therefrom.

7. A system as defined in claim 4, and in addition, means responsive to the absence of a desired information block in any of said memory banks and said content-addressed memory to thereupon read out the desired information block from said main memory.

8. A buffer memory system, comprising an address register having a set portion for set bits and having a tag portion for tag bits, a main memory having information block storage locations addressable by said set and tag bits in combination, at least two buffer memory banks each having storage locations addressable by said set bits for the storage of tags and associated information blocks, a content addressed memory for the storage of associated tags, sets, and information blocks, means to determine whether an information block corresponding to the contents of the set and tag portions of said address register is present in one of said buffer memory banks or said content addressed memory, and to provide "present" and "not present" output signals, means responsive to a "present" signal to read out the corresponding information block, means responsive to "not presnent" signals to apply the set and tag bits to the main memory to read out the corresponding information block, and which includes means to transfer the tag portion of the address and the information block to a location determined by the set portion of said address into one of said buffer memory banks, and means operative when a tag and information block are applied to an already occupied location in a buffer memory bank to transfer the displaced tag and information block together with the set portion of the address to said content addressed memory, whereby said content addressed memory provides rapid-access storage space for additional information blocks belonging to the same sets as information blocks stored in the two buffer memory banks.

* * * * *